United States Patent [19]

Polyakov et al.

[11] Patent Number: 4,787,248

[45] Date of Patent: Nov. 29, 1988

[54] METHOD FOR MEASURING AMPLITUDE OF MECHANICAL VIBRATIONS

[75] Inventors: Arkady V. Polyakov; Genrikh A. Speransky, both of Moscow, U.S.S.R.

[73] Assignee: Nauchno-Proizvodstvennoe Obiedinenie Stroitelnogo I Dorozhnogo Mashinostroenta "Vniistroidormash", Moscow, U.S.S.R.

[21] Appl. No.: 939,807

[22] Filed: Dec. 9, 1986

[51] Int. Cl.$^4$ .................... G01H 9/00; G01H 17/00
[52] U.S. Cl. ........................... 73/649; 73/660
[58] Field of Search .................... 73/649, 660

[56] References Cited

U.S. PATENT DOCUMENTS 1,673,949  6/1928  Rathbone ............... 73/649
2,261,838  11/1941  Allendurf ............... 73/660
4,364,275  12/1982  LaMar .................. 73/649

OTHER PUBLICATIONS

Catalogue of Schenck, Vibroport, Frg.
"Instruments and Systems for Measuring Vibration, Noise, and Impact", Reference Book, vol. 2, Moscow, Machinostroyeniye, 1978, pp. 65-68.
Ju. N. Jorish, "Vibrometry", Moscow, 1963, p. 469.

Primary Examiner—Stewart J. Levy
Assistant Examiner—Robert P. Bell
Attorney, Agent, or Firm—Fleit, Jacobson, Cohn & Price

[57] ABSTRACT

A method for measuring the amplitude of mechanical vibrations comprises the application of a measuring sign in the form of a measuring circle to the surface of the vibrating object, the radius of said measuring circle being of any length selected out of the range of measured values. Each measuring sign vibrating jointly with the object forms a figure of its own and the vibration amplitude of the object is measured along the radius of that particular measuring circle whose visually percepted parts are in contact in the center of the figure formed by said circle.

5 Claims, 2 Drawing Sheets

METHOD FOR MEASURING AMPLITUDE OF MECHANICAL VIBRATIONS

TECHNICAL FIELD

The present invention relates to the means for measuring mechanical quantities by an optical method and more particularly it relates to the methods for measuring the amplitude of mechanical vibrations.

The invention may be utilized for measuring and checking the vibration parameters during examination and adjustment of vibration machines used for consolidation of soils and viscous materials, pile driving, transportation, washing, dehydrating, separation of free flowing materials by lump size and mass, for vibrators and vibratory-impact tools and other similar applications.

BACKGROUND OF THE INVENTION

The current electronic apparatuses for measuring amplitudes are expensive, call for the provision of supporting platforms for accelerometers, for their calibration, and impose certain requirements for operator's qualifications. Therefore, their employment under hard service conditions proves impractical. The measuring error of these apparatuses is ±10% (see, for example Catalogue of Schenck, Vibroport, FRG).

Known in the prior art is a method for measuring the vibration swings by an indicator-type lever-actuated mechanical instrument and recording the results on waxed paper, said instrument referred to as "vibrograph" (see, for example, "Instruments and Systems for Measuring Vibration, Noise and Impact". Reference Book vol. 2, Moscow, Machinostroyeniye 1978, p. 439). The use of such a vibrograph calls for providing supporting platforms on the vibration machine frame, said platforms being perpedicular to the main directions of vibrations.

Inaccuracies in the installation of supporting platforms, particularly in the case of elliptical vibration trajectories, a low-frequency component of vibrations of the machine and operator's hands as well as the error of the instrument proper, results in a large basic percentage error, reaching ±25%.

Most closely approaching the hereinproposed method is the known method comprising application of a sign in the form of a "measuring wedge" to the external surface of the vibration machine; during plane-parallel motion of the vibration machine said wedge forms a figure made by the extreme positions of the wedge due to the stroboscopic effect of visual perception (see, for example, Ju.N. Jorish "Vibrometry", Moscow 1963, p. 469). The vibration amplitude is determined by the point of intersections of the extreme wedge positions in accordance with the graduation scale.

The method of measurement with a measuring wedge is simple and fast, but its employment is restricted to measuring the rectilinear vibrations alone. Another substantial disadvantage is low measuring accuracy due to poor contrast (blurring) of the intersection point of contours arranged at an acute angle and to out-of-squareness of the wedge to the direction of vibration. This leads to a relative error of ±15% and impairs the adjustment of the vibration machine for an optimum operating mode.

BRIEF DESCRIPTION OF THE INVENTION

An object of the invention resides in providing a method for measuring the amplitude of mechanical vibrations which would step up the accuracy of measurements.

Another object of the invention resides in broadening the field of application of the method by providing conditions for measuring the parameters of vibration trajectories of various shapes.

This is attained by providing a method for measuring the amplitude of mechanical vibrations in vibration machines comprising the application of measuring signs to the surface of the vibrating object, each of these signs during joint vibration with the object forming a visual image of its own, and determining the amplitude of mechanical vibrations by the outline of the images in which according to the invention, each measuring sign is made in the form of a measuring circle with a radius of any magnitude within the range of measured amplitudes and the vibration amplitude of the object is measured along the radius of that particular measuring circle whose visually perceptible parts are in contact in the centre of the image formed by said circle.

It is expedient that in the object vibrating over a circular trajectory the vibration amplitude be measured along the radius of that particular measuring circle whose visible parts form a point in the center of the corresponding image while in the object vibrating over a rectilinear trajectory the vibration amplitude be measured along the radius of that particular circle which forms an image with a central contact of the stroboscopically stationary diametrically opposite parts of the measuring circle.

When the object vibrates over an elliptical trajectory, the vibration amplitudes along the smaller and larger axes of the ellipse can be measured along the radius of those particular measuring circles which form the smaller and larger image, respectively, with the visible parts of the measuring circle contacting in the center.

It is preferable that the radius of each subsequent measuring circle should be larger than the radius of the preceding circle by the value of one scale graduation unit.

The hereinproposed technical solution enables the accuracy of measuring the amplitude of mechanical vibrations to be raised for at least three forms of vibrations, i.e. circular, rectilinear and elliptical.

BRIEF DESCRIPTION OF THE DRAWINGS

Other objects and advantages of the present invention will become apparent from the description of its embodiments that follows, with reference to the accompanying drawings in which.

DETAILED DESCRIPTION OF THE INVENTION

A method for measuring the amplitude of mechanical vibrations used for measuring and checking the vibration parameters in examining and adjusting vibration machines comprises the following.

Figure 1:
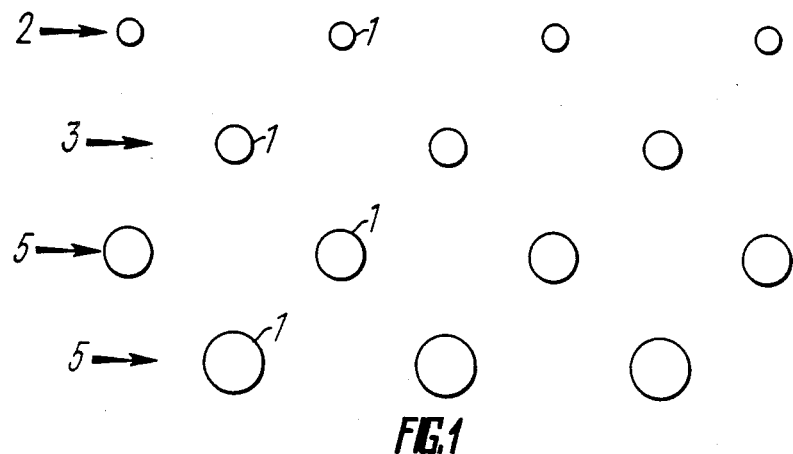
FIG. 1 illustrates a set of measuring signs according to the invention, applied to the vibrating surface.

The surface of the vibrating object is provided with measuring signs, for example in the form of measuring circles 1 (FIG. 1); for this purpose a card is prepared showing a set of measuring circles 1 arranged in four rows 2, 3, 4 and 5, preferably in a staggered order, which facilitates visual observation of each measuring sign.

The radiuses of the measuring circles 1 vary in size and are selected on the basis of the range of measured vibration amplitudes, i.e. each radius corresponds to one value of the measured amplitude.

It turned to be most convenient that the radius of each subsequent measuring circle 1 would be larger than the radius of the preceding one, therefore the radiuses of the circles 1 in each row 2 through 5 grow from the first to the last one. However, it is also possible that the radiuses of the circles 1 will grow from the last to the first one (not shown in the drawing).

If the measuring scale is taken as a difference between the radiuses of the first and last measuring circles 1, the graduation unit of this scale will be the difference between the radiuses of the adjacent circles 1.

During vibration of an object marked with measuring circles 1 in the case of a circular vibration, each point of the circle 1 describes a circular motion 6 (FIG. 2) corresponding to the shape of vibrations, with an amplitude equal to the vibration amplitude of the object. As a result of visual perception the operator sees an image 7 formed by more densely-spaced moving points of the circle 1 the number of such images 7 being equal to the number of measuring circles 1.

FIGS. 7 differ from one another in size: the larger the radius of the circle 1, the larger the radius of the outer contour of the image 7. The radius of the inner contour of the image 7 diminishes with the growing of the radius of the measuring circle 1 and forms a point 8 in the center of that image 7 which corresponds to the circle 1 whose radius is equal to the vibration amplitude. The subsequent images 7 have a dark spot 9 in the center which grows in size from the preceding to the subsequent image 7.

Thus, to determine the amplitude of mechanical vibrations it is enough in the set of measuring circle 1 to select the one with point 8 in the center. Knowing the precise radius of this circle it is possible to find the value of the vibration amplitude equal to this radius.

When the object vibrates over a rectilinear trajectory, each point of each circle 1 accomplishes the identical rectilinear vibrations, describing an image 10 (FIG. 3) whose outer contour contains semicircles with a radius equal to the radius of the corresponding measuring circle 1, and straight lines whose length is equal to twice the vibration amplitude. Observed visually inside the image 10 are stroboscopically stationary diametrically opposite parts of the corresponding measuring circle 1.

The stationary parts of the circle are separated in the center of the images 10 corresponding to the circle 1 whose radius is smaller than the vibration amplitude and the distance between them diminishes concurrently with the growth of the radius of the circle 1.

Figure 3:
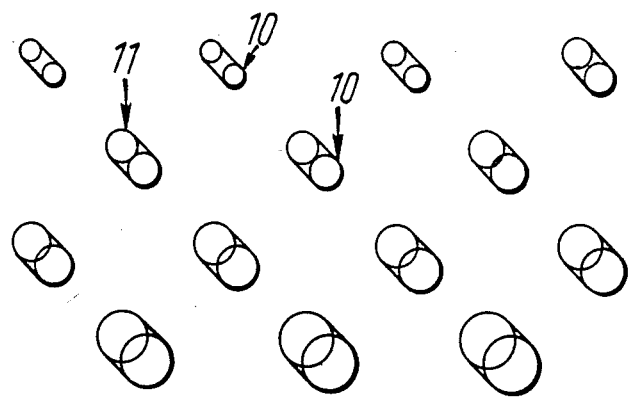
FIG. 3 is a set of images formed by the measuring signs according to the invention, in the rectilinear shape of vibrations.

The stationary parts of the measuring circle 1 are in contact in the center of the image 10 formed by the circle 1 whose radius is equal to the vibration amplitude (shown by arrow 11 in FIG. 3).

The stationary parts of the circles 1 intersect in the center of the images 10 corresponding to the circle 1 whose radius is larger than the vibration amplitude.

Observation of the vibrations of the set of measuring circles 1 gave ground to a conclussion that the vibration amplitude is equal to the radius of a circle wherein the visible parts of the measuring circle 1 are in contact in the center 11.

Figure 4:
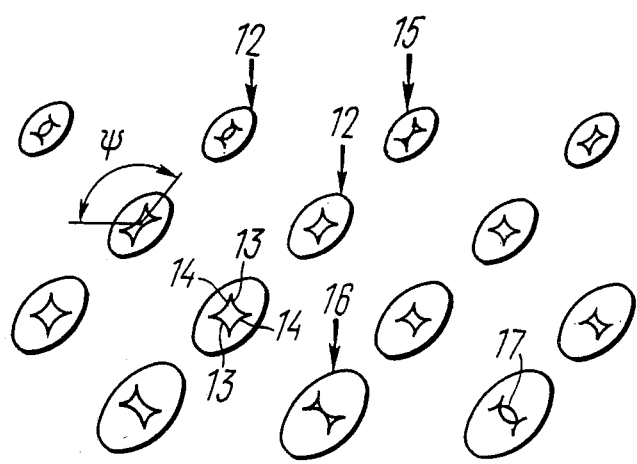
FIG. 4 is a set of images formed by the measuring signs according to the invention, in the elliptical shape of vibrations.

FIG. 4 illustrates the vibrations over an elliptical trajectory. These vibrations are classified into those along the smaller and larger axes of the ellipse.

Images 12 formed by the vibrating measuring circles 1 have an outer contour in the shape of an ellipse and an inner contour formed by the stroboscopically stationary diametrically opposite parts 13 of the measuring circle 1 (FIG. 1) and sectors 14 (FIG. 3) having a more densely spaced moving points of the measuring circle 1.

In the centre of the images 12 corresponding to the measuring circle 1 with a radius which is smaller than the vibration amplitude along the smaller axis of the ellipse, the sectors 14 are separated, while at a radius of the measuring circle 1 which is equal to the vibration amplitude along the smaller axis the sectors 14 are in contact (arrow 15) and with increasing circle radius these sectors 14 diverge and the distance between them grows.

However, if the radius of the measuring circle is smaller than the vibration amplitude along the larger axis of the ellipse, the sectors 13 of the measuring circles 1 are separated from on another and, as the radius of the measuring circle 1 grows, they converge from one image 12 to another while at an equality of the radius of the measuring circle 1 with the vibration amplitude along the larger axis these sectors 13 are in contact in the centre of the image 12 (arrow 16).

As the radius of the measuring circle increases further and becomes larger than the vibration amplitude along the larger axis of the ellipse, the sectors 13 intersect each other (arrow 17).

To determine the vibration amplitude along the smaller axis of the ellipse it is enough to single out an figures out of the set of the formed FIGS. 12 inside of which the sectors 13 of the corresponding circles 1 contact each other and the amplitude will be equal to the radius of this circle. Similarly, the vibration amplitude along the larger axis of the ellipse is equal to the radius of that particular measuring circle 1 which corresponds to the image 12 with the contacting sectors 14.

To provide an example illustrating the proposed method for measuring the amplitude of mechanical vibrations let us consider a version wherein the object is marked with measuring circles 1 having the following radiuses in the growing order. Row 2—2.2 mm, 2.4 mm, 2.6 mm, 2.8 mm; row 3—3.0 mm, 3.2 mm, 3.4 mm; row 4—3.6 mm, 3.8 mm, 4.0 mm, 4.2 mm; row 5—4.4 mm, 4.6 mm, 4.8 mm. The measuring scale in this example is 2.6 mm with a graduation unit of 0.2 mm.

Figure 2:
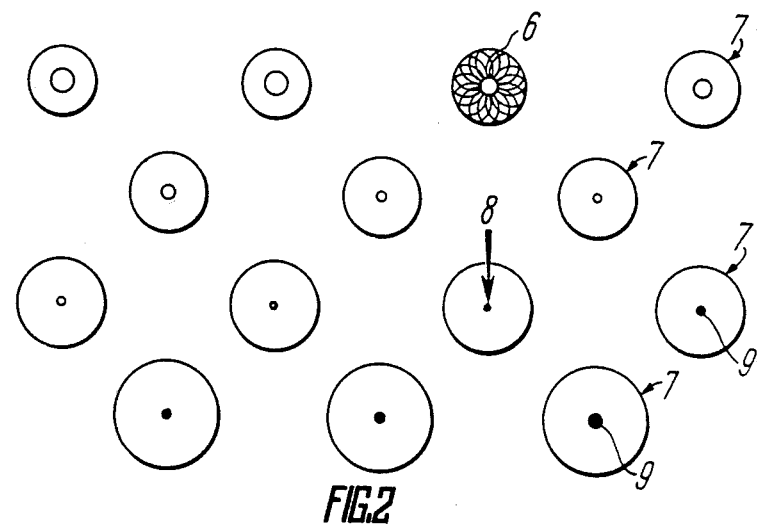
FIG. 2 is a set of images formed by the measuring signs according to the invention, in the circular shape of vibrations.

It is shown in FIGS. 2 through 4 that the vibration amplitude over a circular trajectory is equal to 4.0 mm, that over the rectilinear trajectory, 3.0 mm and that over the elliptical trajectory is 2.6 mm along the smaller axis and 4.6 mm along the larger one.

The use of the proposed method opens the following possibilities:

it increases the measuring accuracy due to a sharp image of the formed figures, insensitivity to changes in the vibration angle and to the low frequency of free vibrations of the vibration machine originated under the impact action on the handled material with the relative error of the vibration parameters of, say, vibroshakers, not exceeding ±5%.

it expands the field of application of the method thus making it possible to measure the parameters of circular and elliptical vibration trajectories;

it renders the method simple and convenient for use under tough service conditions.

The set of circles affixed to the frame of any vibration machine will last long thus affording a possibility of periodical control and diagnostics of the vibration machine. The method is particularly handy for simultaneous control of several points of the machine with a heterogeneous field of vibrations.

The method is sufficiently fast. Thus, measurements in one point of the object take not more than a minute. Besides, the vibration pattern can be easily photographed for subsequent analysis.

The results of measurements obtained quickly and with a high accuracy enable the User to change promptly the vibration parameters with a more accurate adjustment for an optimum operating mode of the vibration machine to suit, say, the properties, composition and particle size of the free-flowing materials handled.

What is claimed is:

1. A method of measuring the amplitude of mechanical vibrations in vibration machines comprising applying a multitude of measuring signs to the surface of the vibrating object, each of said signs being in the form of a measuring circle with a radius selected out of a range of amplitudes to be measured, subjecting said multitude of measuring circles to mechanical vibrations such that each circle forms a discreet visual image, selecting a particular circle from said multitude of circles in which visibly perceived parts of said measuring circle are in contact in the center of said image and taking the value of the measured amplitude as equal to the radius of said particular measuring circle.

2. A method as claimed in claim 1 wherein the vibration amplitude of the object vibrating over a circular trajectory is taken to be equal to the radius of said measuring circle whose visible parts form a point in the centre of said corresponding image.

3. A method as claimed in claim 1 wherein the vibration amplitude of the object vibrating over a rectilinear trajectory is taken to be equal to the radius of said measuring circle which forms said image in which stroboscopically stationary diametrically opposite parts of said measuring circle are in contact in the centre of said image.

4. A method as claimed in claim 1 wherein in the object vibrating over an elliptical trajectory the vibration amplitude along the smaller axis of the ellipse is selected to be equal to the radius of said measuring circle which forms a smaller image with the visible parts of said measuring circle contacting in the centre and the vibration amplitude along the larger axis of the ellipse is selected to be equal to the radius of said measuring circle which forms a larger image with the visible parts of said measuring circle contacting in the centre.

5. A method as claimed in claim 1 wherein the radius of each succeeding measuring circle is larger than that of the preceding circle by the value of one measuring scale graduation unit.

* * * * *